(12) United States Patent
Galles et al.

(10) Patent No.: US 9,152,591 B2
(45) Date of Patent: Oct. 6, 2015

(54) UNIVERSAL PCI EXPRESS PORT

(71) Applicant: CISCO TECHNOLOGY, INC., San Jose, CA (US)

(72) Inventors: Michael B. Galles, Los Altos, CA (US); Hemant M. Vinchure, San Jose, CA (US)

(73) Assignee: CISCO TECHNOLOGY, San Jose, CA (US)

( * ) Notice: Subject to any disclaimer, the term of this patent is extended or adjusted under 35 U.S.C. 154(b) by 102 days.

(21) Appl. No.: 14/019,777

(22) Filed: Sep. 6, 2013

(65) Prior Publication Data
US 2015/0074320 A1    Mar. 12, 2015

(51) Int. Cl.
G06F 13/40 (2006.01)
G06F 13/38 (2006.01)
H04L 29/12 (2006.01)

(52) U.S. Cl.
CPC ............ *G06F 13/385* (2013.01); *G06F 13/409* (2013.01); *G06F 13/4022* (2013.01); *H04L 29/12367* (2013.01); *G06F 2213/0026* (2013.01); *G06F 2213/0058* (2013.01); *G06F 2213/3808* (2013.01)

(58) Field of Classification Search
CPC ............ G06F 13/4022; G06F 13/4081; G06F 2213/0026
See application file for complete search history.

(56) References Cited

U.S. PATENT DOCUMENTS

| | | | |
|---|---|---|---|
| 7,356,636 B2 * | 4/2008 | Torudbakken et al. | 710/313 |
| 7,597,592 B2 * | 10/2009 | Dunstan et al. | 439/680 |
| 7,752,360 B2 | 7/2010 | Galles | |
| 8,189,573 B2 * | 5/2012 | Congdon et al. | 370/360 |
| 8,296,469 B2 * | 10/2012 | Dunstan et al. | 710/8 |
| 8,521,915 B2 * | 8/2013 | Kishore et al. | 710/10 |
| 8,661,178 B2 * | 2/2014 | Richard | 710/313 |
| 8,788,873 B2 * | 7/2014 | Galles et al. | 714/4.11 |
| 8,949,499 B2 * | 2/2015 | Freking et al. | 710/302 |
| 2005/0246460 A1 * | 11/2005 | Stufflebeam, Jr. | 710/104 |
| 2005/0270988 A1 * | 12/2005 | DeHaemer | 370/254 |
| 2006/0242333 A1 | 10/2006 | Johnsen et al. | |
| 2008/0137676 A1 * | 6/2008 | Boyd et al. | 370/419 |

(Continued)

FOREIGN PATENT DOCUMENTS

| | | |
|---|---|---|
| WO | WO2015/034587 | 3/2015 |
| WO | WO2015/034588 | 3/2015 |
| WO | WO2015/034589 | 3/2015 |

OTHER PUBLICATIONS

PCT Nov. 6, 2014 International Search Report and Written Opinion from International Application Serial No. PCT/US2014/048454; 9 pages.

(Continued)

*Primary Examiner* — Brian Misiura
(74) *Attorney, Agent, or Firm* — Patent Capital Group

(57) ABSTRACT

Methods and systems are disclosed herein for providing a universal PCIe port. The same port can be configured to accept a PCIe component as a host or an endpoint (device) symmetrically. The PCIe port can be connected to the host interface or the root complex interface if the PCIe connection is to be configured as a host or an endpoint, respectively. A virtual topology can be provided for a host that associates the host with corresponding endpoints. A mapping between virtual addresses of the corresponding endpoints in the virtual topology and local addresses of the corresponding endpoints is provided.

20 Claims, 5 Drawing Sheets

(56) References Cited

U.S. PATENT DOCUMENTS

| | | |
|---|---|---|
| 2008/0147938 A1 | 6/2008 | Freimuth et al. |
| 2008/0192648 A1 | 8/2008 | Galles |
| 2008/0195756 A1 | 8/2008 | Galles |
| 2010/0115174 A1 | 5/2010 | Akyol et al. |
| 2012/0079478 A1 | 3/2012 | Galles et al. |
| 2013/0042019 A1 | 2/2013 | Galles et al. |
| 2013/0275640 A1* | 10/2013 | Wang et al. .................. 710/300 |
| 2014/0237156 A1* | 8/2014 | Regula et al. ................. 710/314 |

OTHER PUBLICATIONS

PCT Nov. 6, 2014 International Search Report and Written Opinion from International Application Serial No. PCT/US2014/048462; 9 pages.

PCT Nov. 6, 2014 International Search Report and Written Opinion from International Application Serial No. PCT/US2014/048466; 9 pages.

U.S. Appl. No. 14/019,815, filed Sep. 6, 2013 entitled "Universal PCI Express Port," Inventors Michael B. Galles, et al.

U.S. Appl. No. 14/019,841, filed Sep. 6, 2013 entitled "Universal PCI Express Port," Inventor Michael B. Galles.

USPTO Mar. 23, 2015 Non-Final Office Action from U.S. Appl. No. 14/019,815.

USPTO Mar. 23, 2015 Non-Final Office Action from U.S. Appl. No. 14/019,841.

\* cited by examiner

UNIVERSAL PCI EXPRESS PORT

TECHNICAL FIELD

This disclosure relates in general to the field of computing and, more particularly, to methods and systems for providing a universal PCI Express port in a computer system.

BACKGROUND

Computer servers typically include components such as central processing units (CPUs), memory, and input/output (IO) devices. As the needs for computing grows, the number of components in a computer server also grows. To interconnect these components, a blade server chassis can provide a rack unit where component cards can be plugged into an interconnect fabric via a plurality of slots. Blade server chassis on the market may offer 4, 8, 12, 16, or more slots in a single chassis.

Through the interconnect fabric provided in the blade server chassis, the component cards can communicate with other component cards in the blade server chassis or with other systems over a network (e.g., if the blade server chassis provides network connectivity). The functions of the interconnect fabric is typically provided by specialized hardware (for performance reasons), for instance, the interconnect fabric may be implemented as an application specific integrated circuit (ASIC). The interconnect fabric, depending on the chosen configuration of the blade server chassis, would have slots which are each configured to only receive a particular type of component card, for example, a host having one or more CPUs, a target device having an IO device, network interface controllers, or a hard drive (or similar storage device).

Thus, the specific hardware in the interconnect fabric, interconnecting the component cards of a chassis, poses some limitations to ways server components can be configured in a data center. For instance, adding components, which do not work with the empty slots in an existing chassis, prompts a costly purchase for a new chassis. In another instance, some slots in a chassis may be left unused, thereby wasting valuable physical space and resources of a chassis. Furthermore, if different components cards cannot be disaggregated easily, the infrastructure for the various types of component cards and the component cards themselves cannot be scaled or updated independently.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
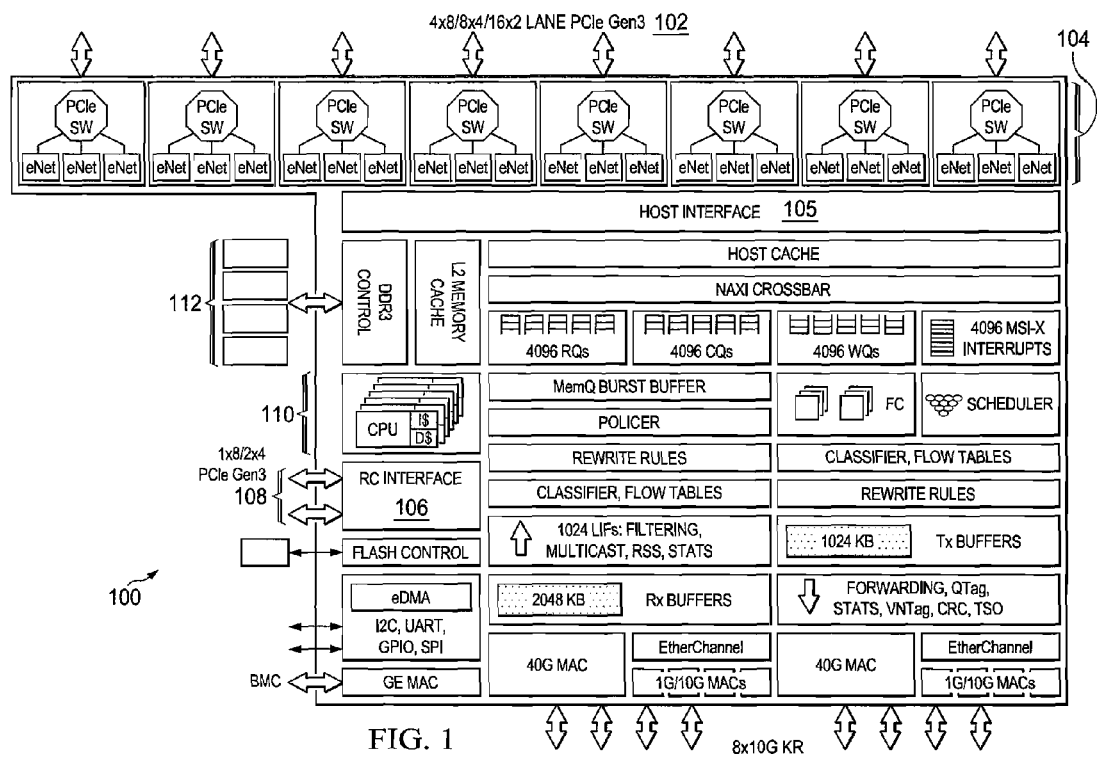
FIG. 1 depicts an illustrative block diagram of an interconnect fabric in a blade server chassis, according to some embodiments of the disclosure.

Methods and systems are disclosed herein for providing a universal PCIe port. The same port is configured to accept a PCIe connection as a host (e.g., a PCIe component as an upstream port or a virtual switch port) or as an endpoint (e.g., a PCIe component having a downstream connection) symmetrically. The PCIe port is connected to the host interface or the root complex interface if the PCIe device is a host or an endpoint, respectively. A virtual topology is provided for a host, which associates the host with corresponding endpoints (or endpoint devices). A mapping between virtual addresses of the corresponding endpoints in the virtual topology and local addresses of the corresponding endpoints is provided.

Furthermore, methods and systems are disclosed herein for providing a universal PCIe port. The same port is configured to accept a PCIe connection as a host or an endpoint symmetrically. Downstream transactions towards an endpoint are intercepted and a virtual address in the downstream transaction is translated to a local address using a mapping. The downstream transactions are forwarded to the endpoint using the local address instead of the virtual address. For endpoints, which share the same local address with multiple hosts, a reverse lookup may be provided to determine which one of the hosts a local address corresponds when forwarding upstream transactions.

PCIe over Ethernet is provided as one embodiment for allowing remote PCIe devices to be associated with a local host (e.g., an upstream port or a virtual switch port) transparently. Besides providing PCIe virtualization mechanisms, the PCIe over Ethernet embodiment also provides non-trivial measures taken to ensure that the transport mechanism still meet the requirements demanded by transport layer packets in the PCIe express standard.

EXAMPLE EMBODIMENTS

One pervasive interconnect fabric architecture includes the Peripheral Component Interconnect Express (PCIe™) architecture (e.g., the PCIe™ protocol version 4.0, published on Nov. 29, 2011 (hereafter the PCIe™ Specification)). Note that the present disclosure could be applicable to any version of the PCIe Specification. A primary goal of PCIe, a standard maintained and developed by the PCI-SIG (PCI Special Interest Group), is to enable components and devices from different vendors to inter-operate in an open architecture spanning multiple market segments; Clients (Desktops and Mobile), Servers (Standard and Enterprise), and Embedded and Communication devices. PCIe is a high performance, general purpose I/O interconnect defined for a wide variety of computing and communication platforms. The more recent versions of PCIe take advantage of advances in point-to-point interconnects, Switch-based technology, and packetized protocol to deliver new levels of performance and features. PCIe is primary connectivity option for server processors, including x86 and ARM architectures.

To provide more flexibility, it has been realized that physical PCIe ports can be virtualized at the PCIe interface, making it possible for a PCIe port to accept hosts and endpoints (or endpoint devices) universally and symmetrically. A universal PCIe port provides more flexibility in server configurations, allowing server designers to disaggregate server components in a data center by separating servers' hosts (e.g., computer processing units and memory configured as an upstream port or a virtual switch port) from endpoints (e.g., endpoint devices, input/output (I/O) devices such as storage and network interface controllers). Disaggregation allows server designs to decouple endpoints from hosts, allowing these subsystems to scale independently and be refreshed to new technology steps independently. Furthermore, disaggregating servers at the PCIe interface allows decoupled subsystems to evolve across a long-lived standards based bus. For instance, multi-server chassis with plug-in blades (component cards) may benefit from universal PCIe port(s) that allows either a server blade (host) or an I/O subsystem blade (endpoint) to be plugged into any of the available slots. Thus, the virtualization of the physical PCIe connection allows independent server and I/O scaling within the same physical envelope.

For instance, blade chassis slots may be configured to accept server blades, PCIe based flash storage blades, traditional storage media blades including a PCIe controller, GPUs for floating point acceleration, cryptography accelerators, and other devices, allowing the customer to build out server capabilities in different directions at different times with a common infrastructure. There is an advantage in allowing customers to upgrade and scale CPU and memory complexes (hosts) independently from IO subsystem complexes (endpoints). When combined with virtualization technology that allows devices or functions to be assigned to individual servers in the local address space of that server, the advantage is multiplied as it enables IO devices to be shared and scaled across multiple servers, including legacy operating systems, as it relies on standard device enumeration, resource mapping, and naming mechanisms. Moreover, the PCIe fabric or switch may be configured to support device virtualization, a single I/O device may be shared across multiple independent servers.

Within the context of the disclosure, a host may include one or more processors (typically the "CPU" of a server system) and optionally one or more memory elements that support the one or more processors. A host may be configured as an upstream port or a virtual switch port, to which endpoints may communicate. An I/O or an endpoint (or an endpoint device) may include one or more of: a Network Interface Controller (NIC), an add-in card, an audio processor, a network processor, a graphics card, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such I/O or endpoints device, is referred to as an endpoint. In different terms, a host may be a "master" and an endpoint may be a "slave." In some cases, a device may include a PCIe to PCI/PCI-X bridge to support legacy or other version PCI devices.

Providing a universal PCIe port is not a trivial task. Device virtualization, address, and naming issues, and other problems exist in creating a generic, universal port. The Universal PCIe Port is a connection to a PCIe fabric or switch that supports both host CPU connectivity and I/O device endpoint connectivity to the same physical port. The Universal PCIe Port logic contains a PCIe MAC (Media Access Controller, or generally as a port manager) with the ability to connect to either an upstream, or PCIe Root Complex port, or a downstream, or PCIe device or switch port. In addition to the PCIe MAC, logic with virtualizes the PCIe address space, PCIe device identification, PCIe messaging, and PCIe interrupts is also present. This hardware device virtualization is a key component as it allows different devices or functions to be assigned to different server hosts within the address space and name space of the associated hosts.

To provide a universal PCIe port, many features are provided in an improved interconnect fabric in a server chassis, where the interconnect fabric is composed of point-to-point links that interconnect a set of devices. Generally speaking, an interconnect fabric comprises specialized hardware and circuitry for processing transactions between devices, and for providing communication routing capabilities (i.e., switches, buses, signal wires, etc.) to forward these transactions. For instance, the interconnect fabric may be at least partly implemented on an Application-Specific Integrated Circuit (ASIC), and the universal PCIe port may comprise of input and output pins/wires to which PCIe components/cards/devices can connect and provide signal connectivity to the interconnect fabric between the PCIe components/cards/devices and the interconnect fabric. To illustrate, FIG. 1 depicts an illustrative block diagram of an interconnect fabric 100 in a blade server chassis, according to some embodiments of the disclosure.

One or more hosts may connect to a host interface 105 through PCIe lanes 102, and each host may be virtualized with one or more virtual topologies 104, as shown as PCIe hierarchy structures (or referred to as "PCIe trees"). A virtual topology associates a host with one or more endpoints, signifying relationships among host(s) and endpoint(s) in a server system. Other devices connected to the interconnect fabric and devices in the interconnect fabric can address and communicate with the hosts through the host interface. One or more endpoint devices may connect to a root complex interface 106 through PCIe lanes 108. Other connections/devices connected to the interconnect fabric and devices in the interconnect fabric can address and communicate with the hosts through the root complex interface, using one or more local addresses for the endpoints.

Generally, the interconnect fabric includes one or more processors 110 and a local memory 112 (comprising one or more memory elements) for processing transactions between devices. The one or more processors may include any processing element, such as a microprocessor, a host processor, an embedded processor, a co-processor, or other processor. The local memory 112 may include any suitable computer-readable non-transient memory element(s). The one or more processors 110 and the local memory 112 serve several important roles.

First, the one or more processors in the interconnect fabric may serve as a configuration agent and/or a port manager. The one or more processors may determine whether the physical PCIe component connected to the universal PCIe port is to be configured as a host or an endpoint. A PCIe component card either carries a host or an endpoint (could have multiple hosts and endpoints), thus, some interconnect fabrics may have the ability to detect/determine whether the PCIe component is to be configured as a host (e.g., an upstream device) or as an endpoint (a downstream device). In some instances, an administrator may provide user input which indicates to the interconnect fabric whether the PCIe component connected to the interconnect fabric is a host or an endpoint, if the interconnect fabric cannot determine on its own whether the PCIe component card carries a host or an endpoint. Based on the user input from the administrator, e.g., through a user interface, the one or more processors determines whether a discovered PCIe component on the PCIe bus is to be configured as a host or an endpoint. Accordingly, the one or more processors connect the PCIe component at the PCIe port to the host interface 105 if the PCIe component is being configured (by the administrator) as a host or to the root complex interface of the PCIe component is being configured as an endpoint. In one embodiment, the one or more processors may configure one or more multiplexers to select a set of signal wires to provide either upstream signal connectivity or downstream signal connectivity between the PCIe component to the host interface or the root complex interface (respectively), depending on whether the PCIe device is/has a host or an endpoint device, respectively.

Second, the one or more processors configures the interconnect fabric to virtualize each host with separate virtual topologies, e.g., each virtual topology comprising a PCIe tree/hierarchy. Virtual topologies associate a particular host with corresponding endpoints, where the corresponding endpoints are addressable using one or more virtual addresses from the point of view of the particular host. Furthermore, the one or more processors provide one or more mappings between virtual addresses used in the virtual topologies to (actual/physical) local addresses used by the root complex interface for addressing endpoints. Virtual addresses from the host view (i.e., point of view from the host) may be different from the local addresses from the local view (i.e., point of view from the one or more processors in the interconnect fabric and endpoint(s)). The mappings thus allow virtual addresses to be translated to local addresses (and vice versa). The one or more processors thus has a role for appropriately allocating and provisioning addressing space for endpoints and mapping of virtual addresses to local addresses of endpoints to ensure independent and isolated operation between the various hosts (e.g., providing isolated operation of hosts where one host is not aware of and/or does not interact with another host).

Third, the one or more processors in the interconnect fabric may serve a proxy, or a proxy processor between the hosts at the host interface and the endpoints at the root complex interface. The one or more processors may intercept and/or forward upstream and downstream transactions between hosts and endpoint s and perform any necessary translations between virtual and local addresses. In some embodiments, the one or more processors may be configured to encapsulate transactions to a remote host/endpoint device for transporting transactions over a different communication protocol (e.g., Ethernet).

Figure 2:
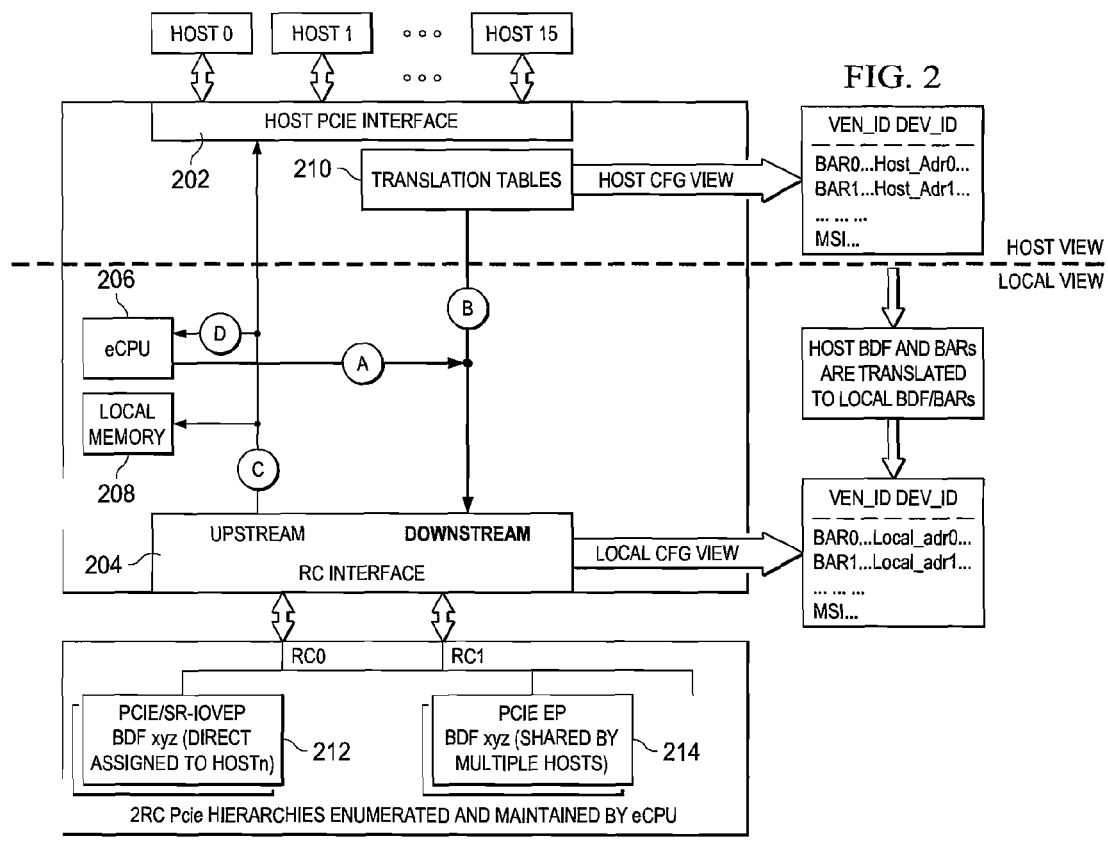
FIG. 2 depicts an illustrative functional diagram of an interconnect fabric, according to some embodiments of the disclosure.

FIG. 2 depicts an illustrative functional diagram of an interconnect fabric, according to some embodiments of the disclosure. Once it is determined whether a PCIe component connected to the PCIe port is/has a host or an endpoint, the PCIe port is connected to either the host interface 202 or the root complex interface 204 according to the determination (e.g., the PCIe component at the PCIe port is provided with signal connectivity to the appropriate interface/bus/switch). In an exemplary embodiment, up to 16 hosts ("Host 0" . . . "Host 15") can be connected to the host interface 202. The eCPU 206 may be a proxy processor (located functionally and/or communicably) between the host interface 202 and the root complex interface 204. The eCPU 206 may enumerate the PCIe endpoints connected at the root complex interface 204, and present the endpoints as a virtual Network Interface Card (vNIC) to the hosts at the host interface 202. In an exemplary embodiment, up to 128 external virtual/physical endpoints (or endpoint devices) may be connected to the root complex interface 204.

After power up, depending upon the selected product configuration (which is outside the scope of this disclosure), the eCPU 206 may enumerate endpoints (and intermediate switches, if present) and maintains the local configuration view ("Local CFG View" in FIG. 2) for an endpoint BDF's configuration space. eCPU 206 assigns the Memory/IO base address register (BAR) address ranges for various discovered endpoint(s). Assigned Memory/IO BAR address ranges may be defined within the local memory 204 in the interconnect fabric, and/or a memory at the host.

Endpoints connected to the root complex interface within the context of PCIe are addressable using local addresses such as (corresponding) bus/device/function (BDF) numbers, memory space address(es), and/or input/output space address(es). In PCIe express, these local addresses are based on a local configuration view (denoted as "Local CFG View" in FIG. 2), i.e., a configuration of endpoints from the perspective of the embedded computer processing unit 206 (hereinafter "eCPU", comprising one or more processors) and the endpoints. The local configuration view defines how the eCPU 206 can address endpoint devices locally within the (physical network provided by) the root complex interface 204. In some embodiments, the root complex interface 204 may present the endpoints as the virtual network interface cards (vNICs) having the local addresses of the endpoints.

To communicate with a PCIe endpoint device, the eCPU 206 can address/identify the endpoint using a BDF number to access a device's configuration space. Furthermore, the eCPU 206 may address I/O and memory regions/spaces of an endpoint (e.g., specifying one or more regions in the local memory 208) using, e.g., memory space or I/O space addresses programmed in base address registers (BARs) in the endpoint device's configuration space. The use of local addresses, BDF numbers, and/or BARs, to address an endpoint is performed according the PCIe standard.

If the PCIe component is a host (or the PCIe port is to be configured as a host), the eCPU 206 determines one or more corresponding endpoints for the host. This determination may be performed based on user input from an administrator through a user interface associating a particular host with one or more corresponding endpoints or endpoint devices. Administration of the association between hosts and endpoints (or endpoint devices) can be policy based or manually specified, and can be controlled from a network based configuration console or configured from a host CPU.

After determining the corresponding endpoints, the eCPU 206 provides a first virtual topology that associates the host with one or more endpoints addressable through virtual addresses of the one or more corresponding endpoints. The virtual addresses are defined within the host configuration view (denoted by "Host CFG View"), and may be different from the local address of the corresponding endpoints. To ensure that the host can properly address the corresponding endpoints, the eCPU 206 provides a first mapping between the virtual addresses of the corresponding endpoints and the local address of the corresponding endpoints.

If the PCIe component is an endpoint (or the PCIe port is to be configured as an endpoint), the eCPU 206 may configure the endpoint to associate the endpoint with a host connected to the interconnect fabric. The eCPU 206 may determine a host for the endpoint, e.g., based on user input from an administrator through a user interface associating the particular endpoint with a host. After determining the corresponding host, a second virtual topology for the corresponding host is determined (or provisioned if the second virtual topology does not exist yet), wherein the second virtual topology associates the corresponding host with the particular endpoint. The eCPU 206 may provide a second mapping between a virtual address in the second virtual topology (addressing/identifying the particular endpoint) and the local address of the endpoint.

The first mapping and the second mapping are provided, e.g., by a PCIe virtualization engine in the eCPU 206 (or in some cases without assistance from the eCPU 206, but provided by another processor, function, or dedicated unit), to translate virtual addresses to local addresses from the host configuration view to the local configuration view. To ensure that PCIe components/connections are addressed properly, the first mapping and the second mapping (denoted as "Translation Tables 210") may translate host CFG view BDFs and BARs to local CFG view BDFs and BARs. In some embodiments, the first mapping and the second mapping may each include a lookup table (e.g., a content addressable memory (CAM) or any suitable data structure) which associates virtual addresses of endpoints used by a particular host with corresponding local addresses of those endpoints. The mapping allows the hosts to transparently address endpoints without knowing the actual local addresses of the endpoints. The virtualization through the mappings also allows the eCPU (or other suitable standalone entity to ensure the local memory 208 is allocated to endpoints properly). Furthermore, by providing separate virtual topologies and appropriately provisioning local addresses for the endpoints of different hosts, the hosts are enabled to operate independently and separately from each other. Moreover, the eCPU 206 effectively virtualizes the host's view of the root complex endpoint configuration space through the translation tables 210.

After the translation table(s) are configured, the eCPU 206 can manage upstream transactions and downstream transactions. Within the context of the disclosure, upstream transactions comprises communications, i.e., PCIe traffic, from endpoints to hosts at the host interface 202 and/or the eCPU 206, and downstream transactions comprises communications, PCIe traffic, from eCPU 206 and hosts at the host interface 202 to endpoints connected at the root complex interface 204.

PCIe upstream and downstream transactions may be described in the following four categories. Lettering A-D below corresponds to labels A-D in the forwarding paths shown in FIG. 2.

A. eCPU 206 may transmit/forward downstream transactions to endpoints at the root complex interface 204 for the purpose of:
 i. enumerating endpoints (e.g., device discovery and configuration);
 ii. operating of vNICs implemented on eCPU 206 to address endpoint devices; and
 iii. Processing PCIe transactions from hosts and other PCIe indirect transactions/requests that may need to be proxied by eCPU 206.

B. Hosts may transmit configuration/I/O/memory (CFG/IO/MEM) related downstream transactions that are forwarded directly by hardware after translating the BDF and BAR addresses from host CFG view to Local CFG View using the translation tables 210 (e.g., translation may be managed by eCPU 206).

C. Upstream direct memory access (DMA) transactions/requests/upstream interrupts/PCIe messages from endpoint devices are forwarded to either host memory or local memory 208 (DMA transactions can target host memory, local memory in the ASIC, or even other devices within the PCIe hierarchy (known as PCIe peer to peer transactions)). For BDFs shared by multiple hosts, optional upstream address translation is performed.

D. Upstream transactions that cannot be directly forwarded by hardware are sent to eCPU 206. Examples include:
 i. Transactions other than Memory (MEM) transaction/request type;
 ii. BDF look up table misses to resolve an identifier of a host (e.g., host_id/vNIC) associated with a host;
 iii. PCIe transactions/messages and PCIe transaction level errors like poisoned, ECRC error, etc.; and
 iv. Transactions that are optionally trapped by access control list (ACL) table look-ups.

Because a host addresses endpoint(s) using the host CFG view, downstream transactions from the host are intercepted by eCPU 206 and virtual address(es) used in the downstream transactions are translated using a mapping between the virtual address(es) of the corresponding endpoint(s) associated with the host and the local address(es) of the corresponding endpoint(s) in the Local CFG View. The downstream transactions are then forwarded onto the appropriate endpoint(s) using local address(es) rather than the virtual address(es).

Upstream transactions from an endpoint can be forwarded by hardware directly to the host or eCPU 206, e.g., when there is a 1 to 1 assignment/relationship between a local address (e.g., BDF number) of the endpoint and a host (shown as mode 212). This may be applicable in situations where a PCIe component card is not shared by multiple hosts, or a PCIe component card is shared by multiple hosts, but the devices are addressable by its own BDF number through the use of Single Root I/O Virtualization (SR/IOV) technology. A simple reverse lookup may be provided in such a mode, which allows a lookup of the proper host which directly corresponds to the local address (e.g., requestor/endpoint device BDF number) from which the upstream transaction originates, to determine the destination host of a particular upstream transaction.

However, in some embodiments, a local address (a single BDF) may be shared by multiple hosts (shown as mode 214). In other words, the same PCIe component card at the PCIe port may include a plurality of endpoint devices that can be associated with different hosts (e.g., multiple hosts share the same PCIe component card) while using the same local address (e.g., the same BDF number). In these embodiments, the upstream transaction may be processed, e.g., by the eCPU 206, to determine which of the multiple hosts the upstream transaction is directed. To determine which of the multiple hosts the upstream transaction is directed, an upstream translator may be provided, and e.g., using the translation tables 210, to perform a reverse lookup of a memory address. The upstream translator may include information associating the different hosts with different memory address or address ranges usable by the endpoints sharing the same local address. The upstream translator may determine an identifier of the host to which the memory address corresponds, and forward the upstream transaction using the identifier to the host interface.

The performance data path is called direct handling by hardware (e.g., the path used by mode 212). The root complex interface may determine the destination vNIC of the corresponding host for the endpoint from which a transaction originates, and forwards transactions directly to host memory or local memory 208 and returns response data and status as PCIe completions to the endpoints accordingly.

The upstream transactions including PCIe Messages, requests other than MEM access, and/or requests that are specifically trapped by translation tables 210 are processed by interrupting eCPU 206. This is called indirect handling and is considered a slow/exception path. In some cases, to avoid the head of line blocking by upstream transactions that needs indirect handling by eCPU 206, per vNIC indirect transaction rings may be provided. Each vNIC indirect ring size can be configured up to 64 pending transactions at a time and each vNIC ring can interrupt the eCPU using a configurable interrupt address.

In some embodiments, the primary data path DMA traffic from endpoints comprises MEM Read/Write (RD/WR) transactions to host memory or local memory 208. In this mode, which is considered fast path, the upstream transactions (e.g., memory requests) are directly forwarded by hardware to the using a host or local memory address. In general, upstream memory requests and their completions are processed directly by a pipeline. Other types of transactions (IO, MSG, etc.) may be forwarded to eCPU to be handled as indirect transactions.

To provide a fast path for forwarding upstream transactions, a lookup table is provided which associates a BDF number (of an endpoint device) with the corresponding host and/or the vNIC address of the corresponding host. This may be performed with or without eCPU 206. If the lookup table is unable to resolve the vNIC address of the corresponding host, the upstream transaction is processed in an indirect mode. The indirect mode is provided to support shared endpoint usage model with assistance from the eCPU 206. In this mode, the BDF lookup itself cannot resolve the vNIC address because the local address (e.g., the BDF number) may be shared by multiple host devices. A reverse lookup may be performed to determine the appropriate host from the multiple hosts, or the upstream transaction may utilize unused bits in the host address space (for addressing hosts) to encode a host identifier.

In some embodiments, local address ranges/regions for endpoints may be allocated as contiguous ranges naturally aligned to 128-byte boundary. A host's maximum address width may be [47:0] for upstream memory descriptors. When a local address (e.g., a BDF number) is shared among multiple hosts, the host address space may have some unused bits. The upstream translator may flexibly use the spare/unused address bits to encode an identifier (host_id, or any suitable host identifier) in the unused bits. The eCPU 206 may act as a proxy processor for the host to post the direct memory access scatter gather lists (DMA SGL lists) descriptor addresses to endpoint devices and provide host address(es) to the endpoint with the encoded host identifier in the unused address bits. Accordingly, the endpoint may transmit host addresses in upstream transactions with the encoded host identifier. The encoded host identifier may then be used to route the upstream transactions to the corresponding host. For instance, hardware in the interconnect fabric may restore the altered bits back to their original values before forwarding the upstream transaction to hosts.

To operate in this mode, it is assumed that the endpoint does not use all the addressable host memory space (e.g., an address space [47:0]). Thus, if there exists a few unused host address bits, the eCPU may insert a unique host_index (or "host_id", or any suitable host identifier) in the unused address bits of the descriptor addresses when posting the DMA SGL addresses to the endpoint on behalf of the host. When the endpoint issues upstream DMA requests, the hardware will strip off the host_index bits and use that to determine vNIC number for the corresponding host. The unused address bits needed to encode host_id or host_index can be variable per BDF depending of 2/4/8/16 hosts sharing that BDF. Using this mode, it is possible to share an endpoint between hosts as well as eCPU 206.

Upstream transactions (memory requests) may go through another lookup used to resolve the vNIC number for the shared BDF model by enabling the compare of the host_index field for a specific BDF, trap requests for a specific VNIC and send it as indirect to eCPU, trap requests targeting a certain host/local memory range and send it as indirect to eCPU, and translate the address in the upstream transaction targeting a certain host/local memory range for direct forwarding with address translation. One example use of the lookup is to set up an entry to protect some local memory region so that an erroneous/unexpected DMA access from an endpoint device does not corrupt local memory 208.

In some embodiments, an interrupt—either an MSI write transaction or a legacy PCIe message—may also be translated such that the transaction is directed to the proper/corresponding host, whether it is a shared resource or a direct BDF mapping. For shared interrupt resources, the addressing scheme can be used to select a host, or the interrupt can be proxied through the eCPU or other mapping hardware to deliver the interrupt to the proper host.

The functionality of a universal PCIe port may be provided even across a communication network, e.g., an Ethernet network, or a data center Ethernet network, at another server chassis having an interconnect fabric that supports the virtualization features described in FIGS. 1-2. PCIe transactions may be encapsulated and transported using a different communication protocol, and these transactions may be decapsulated upon receipt and processed using the virtualization features disclosed herein. For instance, endpoints plugged into PCIe slots in a remote server chassis can be configured using the virtualization features disclosed herein to associate the endpoints in a remote server chassis with hosts in a local server chassis. In some embodiments, PCIe transactions may be encapsulated in an Ethernet packet and transported over Ethernet (but other communication protocols are envisioned). For instance, the Ethernet packets may be transported from one PCIe component to another PCIe component (either upstream or downstream) through a tunnel over an Ethernet connection.

Figure 3:
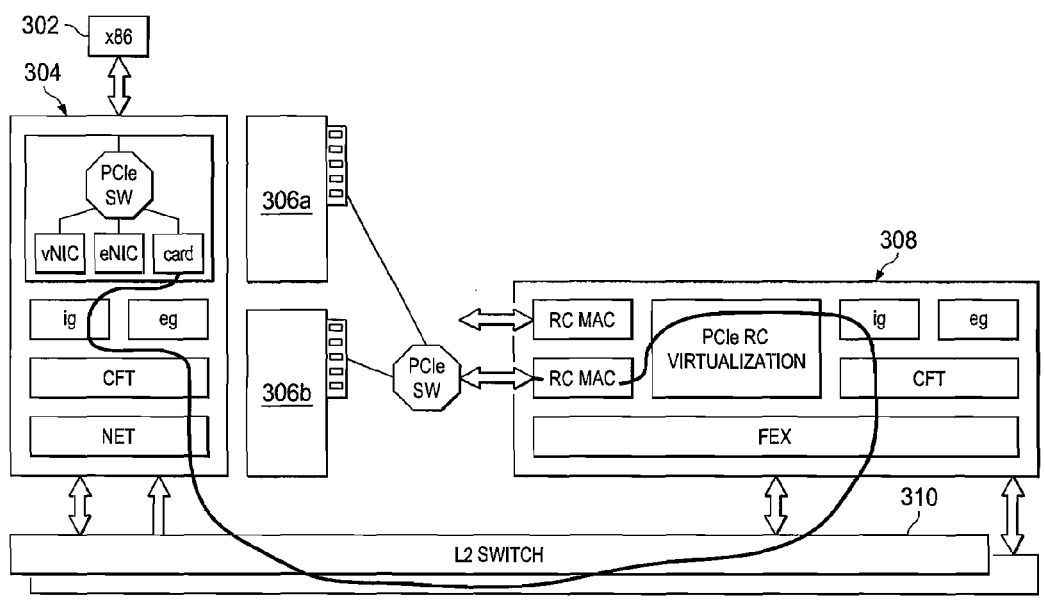
FIG. 3 depicts an illustrative block diagram of two interconnect fabrics communicably connected over a network, according to some embodiments of the disclosure.

FIG. 3 depicts an illustrative block diagram of two interconnect fabrics communicably connected over a network, according to some embodiments of the disclosure. This exemplary system tunnels individual transport layer packets (TLP) of PCIe transactions over Ethernet, between a host 302 at a first interconnect fabric 304 and one or more endpoints 306a and 306b at a second interconnect fabric 308. The PCIe transactions may be routed through an L2 switch 310. The second interconnect fabric 308 may perform an enumeration of its PCIe bus, and discover the one or more endpoints 306a and 306b. Then, the second interconnect fabric may transmit a communication to the first interconnect fabric to indicate that the one or more endpoints 306a and 306b have been discovered.

In some embodiments, based on user input from an administrator, the second interconnect fabric 308 determines that the PCIe components 306a and 306b are to be configured as endpoints and connects them to a root complex interface at the second interconnect fabric 308. A local address may be provisioned to address an endpoint at the root complex interface. For instance, the local address may include at least one of: bus/device/function (BDF) number(s), memory space address(es), and input/output space address(es) for addressing the PCIe endpoint. A PCIe component virtualization engine or broadly a PCIe virtualization engine may present the endpoint(s) as one or more virtual Network Interface Cards (vNICs) having the local address(es). Furthermore, based on the user input, the first interconnect fabric may determine that the PCIe component 302 is to be configured as a host, and connects the PCIe device 302 to a host interface of the interconnect fabric. A virtual topology is provided to associate the host 302 with one or more endpoints 306a and 306*b*, using one or more virtual addresses of the endpoints 306*a* and 306*b*. The virtual addresses are used by the host 302 to address the endpoints 306*a* and 306*b* A mapping is then provided which maps/translates between the virtual addresses (in a host configuration space) and corresponding local addresses of the endpoints (in one or more local configuration spaces). The virtual addresses and the local addresses may be different. Processes of virtualizing hosts and endpoints are similar to processes described in relation to FIGS. 1 and 2. Note that downstream and upstream translations may be performed in the same manner as described in relation to FIGS. 1 and 2. For instance, downstream transactions destined to remote endpoints are intercepted, and virtual addresses used in these downstream transactions are translated using the mapping provided by the PCIe virtualization engine.

To provide an appropriate communication channel between the host 302 and the endpoint(s) 306 and 306*b*, the network address (e.g., an L2 address) of the first interconnect fabric 304 is transmitted from the first interconnect fabric to the second interconnect fabric 308, and the network address of the second interconnect fabric 308 is received at the first interconnect fabric 304 from the second interconnect fabric. Other steps for informing each end of the communication channel of the network address of its peer are envisioned. The exchange of network addresses allows a communication tunnel to be provisioned between the first interconnect fabric 304 and the second interconnect fabric 308 for transporting PCIe transactions (i.e., PCIe over Ethernet packets) between the host 302 and endpoint(s) 306*a* and 306*b*. PCIe transactions, in particular, TLP packets, may be transported by encapsulating the TLP packets in Ethernet packets. Encapsulation may be performed prior to transmitting the encapsulated packets. Decapsulation/extraction may be performed after receiving the encapsulated packets. The extracted PCIe transaction is then forwarded to the appropriate PCIe device.

The tunnel protocol for transporting the PCIe transactions between remotely and communicably connected PCIe devices may include sequence number checking and retransmission to ensure reliable, in-order delivery of frames, as required by PCIe Transport Layer Packets (TLPs). If an Ethernet link or switch fails, the tunnel continues to operate by retransmitting frames on an alternate path. To satisfy the requirements of PCIe TLP transactions, the Ethernet connection preferably satisfies at least one of the following: (1) be low latency, as PCIe layer timeouts can occur with excessive delays, (2) be allocated on a data center Ethernet (DCE) network class of service (COS) with pause enabled, to minimize the chance of packet drops and provide a high quality of service, (3) servers and PCIe card rack units should be in the same data center, preferably connected to the same L2 switch. If the above conditions are met, the PCIe over Ethernet technology can provide reliable connections between hosts and (3rd party) PCIe endpoints. Performance will depend primarily on the latency tolerance of the 3rd party endpoint (or endpoint device)—for example, devices that support a larger number of pending PCIe read requests will suffer minimal performance impact due to increased host memory read latency as compared to devices with few pending PCIe read requests. An exemplary estimate of Device Read Latency is roughly 1.5 microseconds. For comparison, a PCIe endpoint directly connected to the host can expect an idle read latency of about 300 nanoseconds. However, this number is highly variable and depends on the x86 processor state, which can spike to 10's of microseconds in added latency. In order for PCIe over Ethernet to maintain a 10 Gb/s data stream form the host to the endpoint, at least 8 pending reads are required to tolerate a 1.5 microsecond latency (assumes 256 byte TLP payload.) Note that PCIe over Ethernet traffic from the endpoint to the host is not significantly impacted by latency, as writes do not require reserved resources in the device.

The PCIe over Ethernet protocol defines connection establishment, packet encapsulation, reliable delivery, and alternate path retry in the event of failure. The protocol may guarantee in-order delivery of CRC protected PCIe transactions between a PCIe initiator and target (either upstream or downstream). To establish a connection, PCIe over Ethernet connections are set up using a management agent, such as eCPU 206 in FIG. 2 or any suitable processor in the first interconnect fabric 304, and/or the second interconnect fabric 308. The target side, i.e., the second interconnect fabric 308, performs a local enumeration of the PCIe bus, and informs the management agent of discovered cards. The management agent may assign the endpoint(s) 306*a* and 306*b* to the host 302 (e.g., in a virtual topology). Note that a PCIe card having single root I/O virtualization may assign each function (BDF number) to a single host or various hosts, assuming the physical driver can be run by a local management agent at the target interconnect fabric. The management agent informs the first interconnect fabric 304 of the device association and creates a vNIC configuration which includes a virtual PCIe slot for each remote PCIe device to be connected. The initiator host (i.e., the first interconnect fabric 304) may discover the remote PCIe slot during its next reboot during the normal PCIe enumeration process. The management agent may also inform each end of the connection of the L2 address of its peer. Once the connection is established, all PCIe transactions to/from the remote device ID for forwarded to the remote peer in the PCIe over Ethernet tunnel.

The first interconnect fabric may intercept a downstream transaction and determine that the target endpoint (e.g., endpoint(s) 306*a* and 306*b*) is remotely connected through a communication tunnel between the first interconnect fabric 304 and the second interconnect fabric 308. In response, a packet header is constructed for transmitting the intercepted downstream transaction to the endpoint (e.g., using the L2 network address of the second interconnect fabric). The packet header may be used to encapsulate the intercepted downstream transaction, and the encapsulated packet is forwarded to the second interconnect fabric over the communication tunnel.

Figure 4:
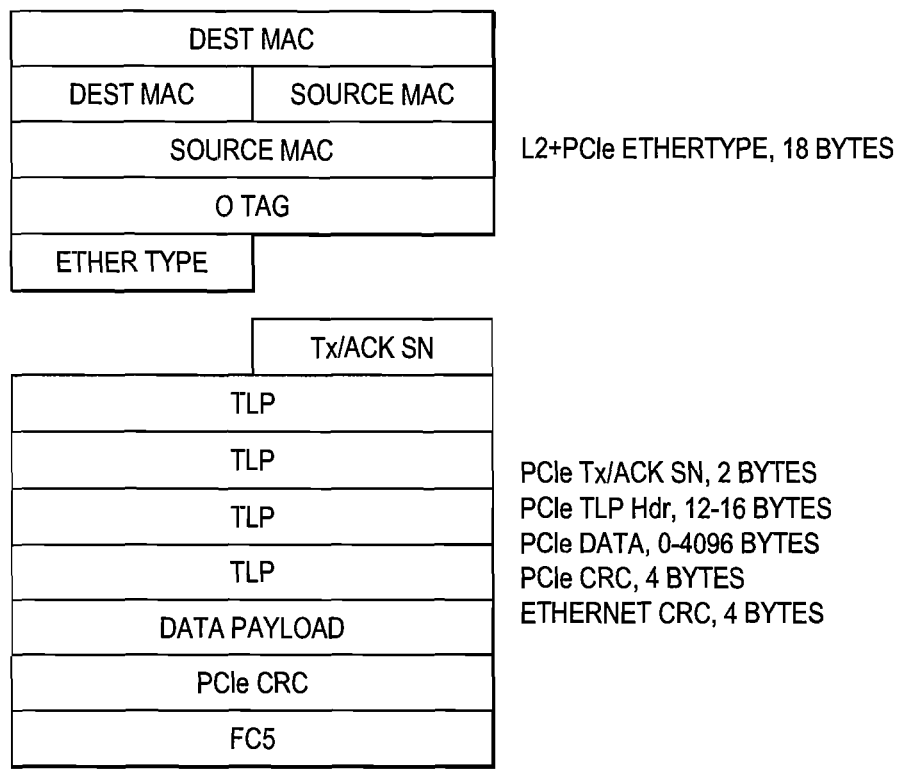
FIG. 4 depicts an illustrative PCIe over Ethernet packet, according to some embodiments of the disclosure.

FIG. 4 depicts an illustrative PCIe over Ethernet packet, according to some embodiments of the disclosure. In the example packet, the PCIe address and data payloads from TLP transactions are encapsulated in L2 packets with a specific PCIe over Ethertype. The format of a single PCIe of Ethernet frame is shown FIG. 4.

The packet header may identify the network address of the second interconnect fabric to allow the packet to be routed to the second interconnect fabric. Furthermore, the PCIe over Ethernet packet may include one or more of the following exemplary fields:

TxSN[8]—Transmit Sequence Number of current frame

AckSn[8]—Acknowledge Sequence Number, or last good TxSN received

TLP[ ]—3DW (12 bytes) or 4DW (16 bytes), as defined by PCIe

Data[ ]—Data payload, 0-4096 bytes, size defined by TLP length field

PCIe CRC[32]—Cyclic Redundancy Check (CRC) protecting SN, TLP, and data

The PCIe over Ethernet header may be identical to the PCIe TLP. The sequence number fields TxSN and AckSN, as well as the PCIe CRC, are outside the standardized TLP definition.

In particular, prior to forwarding an encapsulated downstream transaction, an error detecting code (e.g., CRC) may be appended to the Ethernet packet to protect the data integrity of the PCIe sequence number(s), the transport layer packet (TLP), and the data payload in the downstream transaction.

PCIe over Ethernet may employ a sliding window protocol with go-back-n retry to recover from detected errors. Each frame is tagged with a sequence number before transmit. For instance, the sequence number is assigned in the order transactions are transmitted (incrementing as transactions are being transmitted, repeating a sequence of numbers). The receiving interconnect fabric may check the data integrity using, e.g., the PCIe CRC and/or the existing 802.3 FCS (a CRC-32 checksum). A mismatch between the transmitted and expected sequence numbers or a CRC or FCS error will cause the receiver to discard the frame. A received frame that matches the expected sequence number and has a correct FCS will be passed directly to the appropriate PCIe device. Correctly received frames may generate an acknowledge notification back to the peer. Acknowledge notifications can be sent independently or piggybacked with the next outgoing transmission. Acknowledged notifications can be lost or coalesced. If no acknowledge notification is received after a programmable retransmit timer expires, one or more frames will be retransmitted, starting with the last unacknowledged frame. For instance, a retransmit timer may start once a PCIe over Ethernet packet having a PCIe transaction is transmitted, and the PCIe over Ethernet packet is retransmitted if an acknowledgement for the transmitted transaction is not received within a specified timeout period. If multiple retransmissions occur above a programmable threshold, an alternate tunnel path can be selected.

Modern PCIe device drivers may minimize PIO read operations to the device. This is helpful for PCIe over Ethernet, as the added latency introduced may cause host CPU stalls and are better avoided. Also note that the most critical timeout event is a host PIO read request. Multiple PCIe over Ethernet retransmission events can extend the latency significantly, approaching host PCIe timeout values. The minimum PCIe timeout value is 50 microseconds, but more typically this value is set to the 10's of milliseconds. PIO writes do not have a strict latency requirement, nor do target device read and write operations. Thus, the host PIO read is a primary request that is exposed to timeout failures.

Figure 5:
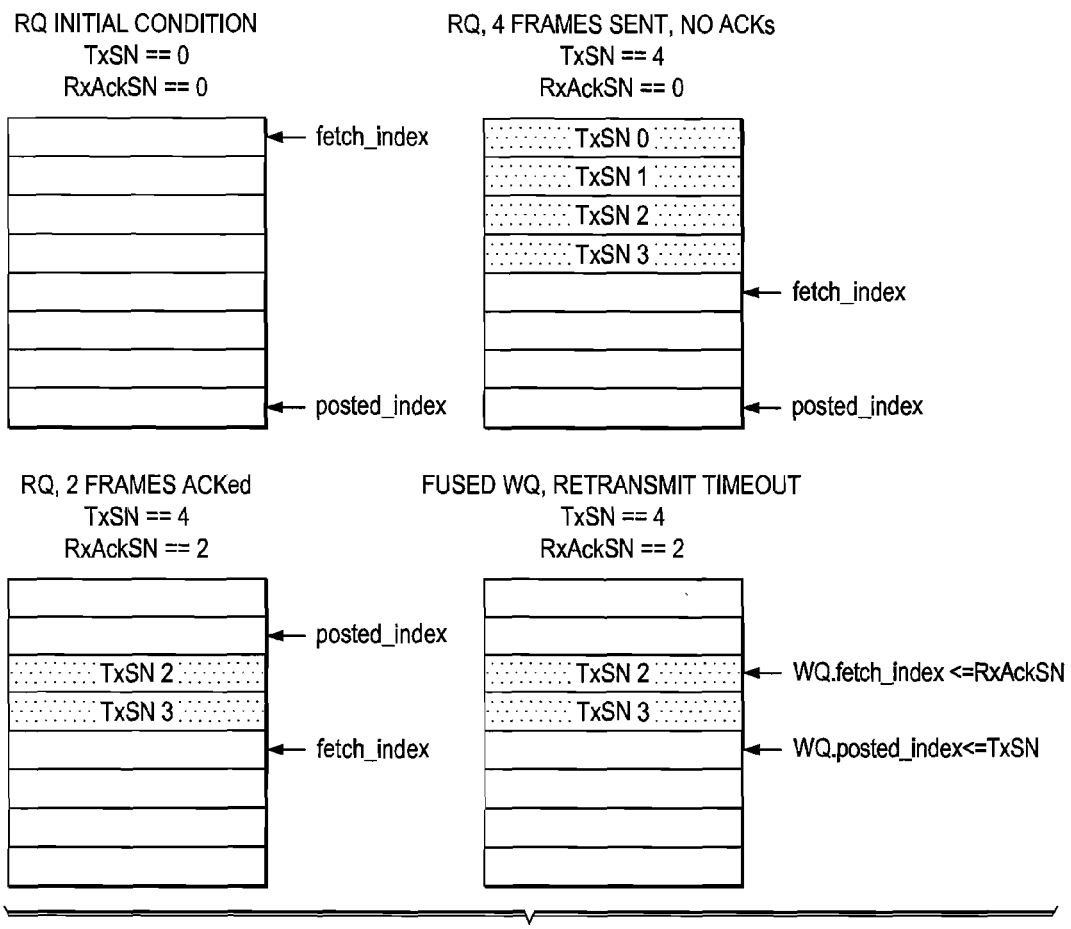
FIG. 5 depicts a scenario for retransmitting PCIe over Ethernet packets, according to an embodiment of the disclosure.

Transmitted PCIe over Ethernet frames may be spanned and stored in a dedicated memory (denoted as "RQ" in FIG. 5). If the remote peer interconnect fabric acknowledges receipt via its AckSN field in arriving frames, the RQ buffers are silently freed and made ready for reuse. If the remote peer interconnect fabric fails to acknowledge receipt within the retransmit timer duration, a retransmission is performed. Retransmission is performed via a fused memory (denoted as "WQ") associated with the retransmission RQ. When a retransmission event is initiated, the rewrite engine will set the posted_index and fetch_index according to the sequence number states then enable the WQ.

For this RQ+WQ pair, the following is may be true (see FIG. 5 for a graphical illustration):
The Index of a buffer in the RQ+WQ also equals the TxSN of the frame it contains.
RQ.posted_index<=RxAckSN−1 when a new Ack arrives, effectively freeing buffers and remote acknowledge.
On a retransmit event, WQ.posted_index<=TxSN; WQ.fetch_index<=RxAckSN.

In some embodiments, that if N retries are not acknowledged, the next retransmission event should try the alternate path; ensure that N*timeout is less than the PCIe timeout value In one example implementation, various devices or components involved in implementing the embodiments described herein can include software for achieving the described functions, and these devices or components disclosed herein may comprise software embodied in one or more non-transitory, tangible media for facilitating the activities described herein. At least a part of the interconnect fabric, PCIe virtualization engine, port manager, user interface, and/or management agent, may also include a memory device (or memory element) 64 for storing information to be used in achieving the functions as outlined herein. Additionally, the interconnect fabric described herein may include one or more processors that is capable of executing software or an algorithm to perform the functions as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the elements can also include suitable interfaces for receiving, transmitting, and/or otherwise communicating data or information in a network environment.

Note that in certain example implementations, the functions outlined herein and in FIGS. 1-3 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element, as shown in FIGS. 1-2, can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor, as shown in FIG. 5, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein (e.g., the various interfaces, translation tables, caches, crossbars, subsystems, etc.) can be provisioned as part of any type of computing element. As used herein, the terms "computing element", "computing device", "switch", "host", "endpoint", etc. are interchangeable and can encompass computers, servers, network appliances, chassis, hosts, routers, switches, gateways, bridges, virtual equipment, circuitry, load-balancers, firewalls, processors, modules, or any other suitable device, component, element, or object operable to exchange information in a network environment. For example, the term 'endpoint' can be associated with various computing devices used to initiate a communication, such as any type of receiver, a computer, a set-top box, an Internet radio device (IRD), a cell phone, a smartphone, a laptop, a tablet, a personal digital assistant (PDA), a Google Android™, an iPhone™, an iPad™, a Microsoft Surface™, or any other device, component, element, endpoint, or object capable of initiating voice, audio, video, media, or data exchanges within the system.

Moreover, these elements may include any suitable hardware, software, components, modules, interfaces, or objects that facilitate the operations thereof. This may be inclusive of appropriate algorithms and communication protocols that allow for the effective exchange of data or information.

In one implementation, these elements/devices can include software to achieve (or to foster) the PCIe activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other element to achieve the intended functionality. Alternatively, these network devices may include software (or reciprocating software) that can coordinate with other elements in order to achieve the management activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four elements. However, this has been done for purposes of clarity and example only. In certain cases, it may be easier to describe one or more of the functionalities of a given set of flows by only referencing a limited number of elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for configuring a Peripheral Component Interconnect Express (PCIe) port of a server chassis to accept a PCIe component connected to the PCIe port as a host or an endpoint, the method comprising:
   determining whether the PCIe component is communicably connected to the PCIe port as a host or an endpoint;
   if the PCIe component is a host:
     connecting the host to a host interface in an interconnect fabric;
     determining one or more corresponding endpoints for the host;
     providing a first virtual topology for the host associating the host with virtual address(es) of one or more corresponding endpoints of the host; and
     providing a first mapping between the virtual address(es) of the one or more corresponding endpoints and local address(es) of the corresponding endpoints;
   if the PCIe device is an endpoint device:
     connecting the endpoint to a root complex interface in the interconnect fabric, wherein the endpoint is addressable by a local address through the root complex interface;
     determining a corresponding host of the endpoint and a second virtual topology associated with the corresponding host; and
     providing a second mapping between a virtual address in the second virtual topology and the local address of the endpoint;
   wherein the first mapping and the second mapping is provided by a proxy processor between the host interface and the root complex interface in the interconnect fabric.

2. The method of claim 1, wherein connecting the host to the host interface and connecting the endpoint to the root complex interface depending on whether the PCIe component is a host or an endpoint comprises configuring a multiplexer to select either (1) signal upstream connectivity between the PCIe port to the host interface, or (2) signal downstream connectivity between the PCIe port and the root complex interface for the PCIe port, respectively.

3. The method of claim 1, wherein:
   the first virtual topology and the second virtual topology each comprises a PCIe tree associating a host with one or more endpoints.

4. The method of claim 1, wherein:
virtual address(es) of endpoints are different from the local address(es) of endpoints; and
the first mapping and the second mapping provides translation between virtual address(es) to and/or from local address(es).

5. The method of claim 1, wherein:
the first virtual topology is separate from the second virtual topology to provide isolated operation of hosts where one of the hosts is not aware of and/or does not interact with another one of the hosts.

6. The method of claim 1, wherein:
the local address(es) in the first mapping and the second mapping comprises at least one of: bus/device/function (BDF) number(s), memory space address(es), and input/output space address(es) usable to address endpoint (s) connected to the root complex interface.

7. The method of claim 1, wherein:
the first mapping and the second mapping each comprises a lookup table and/or a content addressable memory table associating virtual addresses with corresponding local addresses of endpoints.

8. The method of claim 1, wherein:
the PCIe component is one of a plurality of endpoints on the same PCIe component card;
the plurality of endpoints share the same bus/device/function number at the root complex interface as the local address, and the plurality of endpoints correspond to different hosts.

9. The method of claim 8, further comprising:
providing an upstream translator for performing a reverse lookup of a memory address used in a transaction from an endpoint to determine to which one of the different hosts the memory address corresponds.

10. The method of claim 9, wherein:
the upstream translator comprises information associating the different hosts with different memory address ranges usable by the plurality of endpoints.

11. An interconnect fabric for configuring a Peripheral Component Interconnect Express (PCIe) port of a server chassis to accept a PCIe component connected as a host or an endpoint, the interconnect fabric comprising:
a port manager configured to:
determine whether the PCIe component communicably connected to the PCIe port as a host or an endpoint;
if the PCIe component is a host, connect the host to a host interface in the interconnect fabric;
if the PCIe component is an endpoint connect the endpoint to a root complex interface in the interconnect fabric, wherein the endpoint is addressable by a local address through the root complex interface;
a PCIe virtualization engine configured to:
if the PCIe component is a host:
determine one or more corresponding endpoints for the host;
provide a first mapping between the virtual address(es) of the one or more corresponding endpoints and local address(es) of the corresponding endpoints;
provide a first mapping between the virtual address(es) of the one or more endpoints of the host and local address(es) of the corresponding endpoints;
if the PCIe component is an endpoint:
determine a corresponding host of the endpoint and a second virtual topology associated with the corresponding host; and
provide a second mapping between a virtual address in the second virtual topology and the local address of the endpoint; and
a proxy processor between the host interface and the root complex interface of the interconnect fabric in the PCIe virtualization engine for providing the first mapping and the second mapping.

12. The interconnect fabric of claim 11, wherein connecting the host to the host interface and connecting the endpoint to the root complex interface depending on whether the PCIe component is a host or an endpoint by the port manager comprises configuring a multiplexer to select either (1) signal upstream connectivity between the PCIe port to the host interface, or (2) signal downstream connectivity between the PCIe port and the root complex interface for the PCIe port, respectively.

13. The interconnect fabric of claim 11, wherein:
the first virtual topology and the second virtual topology each comprises a PCIe tree associating a host with one or more endpoints.

14. The interconnect fabric of claim 11, wherein:
virtual address(es) of endpoints are different from the local address(es) of endpoints; and
the first mapping and the second mapping provides translation between virtual address(es) to and/or from local address(es).

15. The interconnect fabric of claim 11, wherein:
the local address(es) in the first mapping and the second mapping comprises at least one of: bus/device/function (BDF) number(s), memory space address(es), and input/output space address(es) usable to address endpoint(s) connected to the root complex interface.

16. The interconnect fabric of claim 11, wherein:
the PCIe device is one of a plurality of endpoints on the same PCIe component card; and
the plurality of endpoints share the same bus/device/function number at the root complex interface as the local address, and the plurality of endpoints correspond to different hosts.

17. The interconnect fabric of claim 16, further comprising:
an upstream translator in the PCIe virtualization engine for performing a reverse lookup of a memory address used in a transaction from an endpoint to determine to which one of the different hosts the memory address corresponds.

18. The interconnect fabric of claim 17, wherein:
the upstream translator comprises information associating the different hosts with different memory address ranges usable by the plurality of endpoints.

19. A server chassis, comprising:
a rack unit having one or more PCIe slots for receiving Peripheral Component Interconnect Express (PCIe) component card(s); and
an interconnect fabric for configuring a PCIe port in the server chassis to accept a PCIe component as a host or an endpoint, the interconnect fabric comprising:
a port manager configured to:
determine whether the PCIe component communicably connected to the PCIe port as a host or an endpoint;
if the PCIe component is a host, connect the host to a host interface in the interconnect fabric;
if the PCIe component is an endpoint, connect the endpoint to a root complex interface in the interconnect fabric, wherein the endpoint is addressable by a local address through the root complex interface;
a PCIe virtualization engine configured to:
determine one or more corresponding endpoints for the host;

provide a first virtual topology for the host associating the host with virtual address(es) of one or more endpoints of the host; and provide a first mapping between the virtual address(es) of the one or more corresponding endpoints and local address(es) of the corresponding endpoints;

determine a corresponding host of the endpoint and a second virtual topology associated with the corresponding host; and provide a second mapping between a virtual address in the second virtual topology and the local address of the endpoint; and a proxy processor between the host interface and the root complex interface of the interconnect fabric in the PCIe virtualization engine for providing the first mapping and the second mapping.

20. The server chassis of claim 19, wherein connecting the host to the host interface and connecting the endpoint to the root complex interface depending on whether the PCIe component is a host or an endpoint by the port manager comprises configuring a multiplexer to select either (1) signal connectivity between the PCIe port to the host interface, or (2) signal connectivity between the PCIe port and the root complex interface for the PCIe port, respectively.

* * * * *